United States Patent
Garty et al.

(10) Patent No.: US 11,520,831 B2
(45) Date of Patent: Dec. 6, 2022

(54) ACCURACY METRIC FOR REGULAR EXPRESSION

(71) Applicant: ServiceNow, Inc., Santa Clara, CA (US)

(72) Inventors: Asaf Garty, Sdei Hemed (IL); Robert Bitterfeld, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 193 days.

(21) Appl. No.: 16/896,895

(22) Filed: Jun. 9, 2020

(65) Prior Publication Data

US 2021/0382947 A1 Dec. 9, 2021

(51) Int. Cl.
  *G06F 16/903* (2019.01)
  *G06K 9/62* (2022.01)
  *G06F 16/906* (2019.01)

(52) U.S. Cl.
  CPC ...... *G06F 16/90344* (2019.01); *G06F 16/906* (2019.01); *G06K 9/6218* (2013.01)

(58) Field of Classification Search
  CPC ................ G06F 16/90344; G06F 16/906
  USPC ........................................... 707/736
  See application file for complete search history.

(56) References Cited

U.S. PATENT DOCUMENTS

| | | | |
|---|---|---|---|
| 9,330,258 B1 * | 5/2016 | Satish | H04L 63/1441 |
| 10,956,522 B1 * | 3/2021 | Jha | G06F 16/355 |
| 11,010,287 B1 * | 5/2021 | Barua | G06N 20/00 |
| 2006/0167873 A1 * | 7/2006 | Degenaro | G06F 9/45512 |
| 2008/0133443 A1 * | 6/2008 | Bohannon | G06F 40/205 |
| | | | 706/48 |
| 2008/0243905 A1 * | 10/2008 | Pavlov | G06F 16/90344 |
| | | | 707/999.102 |
| 2009/0006392 A1 * | 1/2009 | Chen | G06F 16/2462 |
| 2009/0070328 A1 * | 3/2009 | Loeser | G06F 16/3329 |
| 2009/0265786 A1 * | 10/2009 | Xie | G06F 21/564 |
| | | | 726/24 |
| 2011/0283360 A1 * | 11/2011 | Abadi | H04L 63/1416 |
| | | | 726/24 |
| 2012/0117072 A1 * | 5/2012 | Gokturk | G06F 16/954 |
| | | | 707/E17.089 |
| 2013/0304690 A1 * | 11/2013 | Perlmutter | G06N 5/02 |
| | | | 706/48 |
| 2015/0172159 A1 * | 6/2015 | Ficara | H04L 63/1408 |
| | | | 706/46 |
| 2015/0262079 A1 * | 9/2015 | Livshits | G06F 8/20 |
| | | | 706/12 |

(Continued)

*Primary Examiner* — Tony Mahmoudi
*Assistant Examiner* — Michael Le
(74) *Attorney, Agent, or Firm* — Van Pelt, Yi & James LLP (57) ABSTRACT

A regular expression that is able to be used to identify an item as belonging to a specific group among a plurality of different groups is determined. The regular expression is tested against a sampling of items known to belong to the specific group to determine a true positive metric. The regular expression is tested against a sampling of items known to belong to other groups among the plurality of different groups outside the specific group to determine a false positive metric. An accuracy metric of the determined regular expression is calculated based at least in part on the true positive metric and the false positive metric. The accuracy metric is provided for use in evaluating the regular expression.

20 Claims, 5 Drawing Sheets

(56) References Cited

U.S. PATENT DOCUMENTS

| | | | |
|---|---|---|---|
| 2016/0117387 A1* | 4/2016 | Hernandez | G06F 16/951 |
| | | | 707/722 |
| 2017/0187735 A1* | 6/2017 | Zheng | H04L 63/1416 |
| 2018/0063181 A1* | 3/2018 | Jones | H04L 63/1433 |
| 2018/0189481 A1* | 7/2018 | Liu | G06F 21/53 |
| 2018/0341468 A1* | 11/2018 | Alexander | G06F 8/33 |
| 2019/0044820 A1* | 2/2019 | Rosh | H04L 41/0893 |
| 2019/0089723 A1* | 3/2019 | Valgenti | H04L 63/1425 |
| 2019/0102659 A1* | 4/2019 | Ellis | G06K 9/6276 |
| 2019/0385014 A1* | 12/2019 | Malak | G06F 16/3338 |
| 2020/0004869 A1* | 1/2020 | Dulam | G06F 16/35 |
| 2020/0004870 A1* | 1/2020 | Dulam | G06F 16/93 |
| 2020/0050662 A1* | 2/2020 | Bhat | G06F 40/295 |
| 2020/0125746 A1* | 4/2020 | Joshi | G06F 21/62 |
| 2020/0184957 A1* | 6/2020 | Asumu | G06N 20/00 |
| 2020/0320068 A1* | 10/2020 | Malak | G06F 16/2423 |
| 2020/0320092 A1* | 10/2020 | Malak | G06F 16/258 |
| 2020/0320142 A1* | 10/2020 | Malak | G06F 16/242 |
| 2020/0380045 A1* | 12/2020 | Smith | G06F 16/90344 |
| 2021/0044697 A1* | 2/2021 | Khafizov | G06F 16/35 |
| 2021/0209480 A1* | 7/2021 | Wang | G06F 40/205 |
| 2021/0286806 A1* | 9/2021 | Ahmadi | G06F 16/221 |
| 2021/0334463 A1* | 10/2021 | Wang | G06N 3/126 |

* cited by examiner

ACCURACY METRIC FOR REGULAR EXPRESSION

BACKGROUND OF THE INVENTION

A regular expression is a sequence of characters that define a search pattern. In many scenarios, the search pattern is used to perform operations on strings, e.g., find or find and replace operations. Various syntaxes exist for writing regular expressions. Regular expressions are used in search engines, text editors, dialog boxes, and other applications. Many computer programming languages have regular expression functionality that is built-in or provided via libraries. In various scenarios, regular expressions are not fully accurate in finding target strings. Thus, it would be beneficial to develop techniques directed toward improving measurement of regular expression accuracy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An accuracy metric for regular expression is disclosed. A regular expression that is able to be used to identify an item as belonging to a specific group among a plurality of different groups is determined. The regular expression is tested against a sampling of items known to belong to the specific group to determine a true positive metric. The regular expression is tested against a sampling of items known to belong to other groups among the plurality of different groups outside the specific group to determine a false positive metric. An accuracy metric of the determined regular expression is calculated based at least in part on the true positive metric and the false positive metric. The accuracy metric is provided for use in evaluating the regular expression.

A practical and technological benefit of the techniques disclosed herein is more accurate utilization of regular expressions. In various embodiments, regular expression generation is automated and not fully accurate. For example, a problem with regular expressions generated using machine learning techniques is that they can be overly inclusive or not inclusive enough. An automatically generated regular expression may not match desired target strings. Thus, in order to address such inaccuracy, it would be beneficial to present to a user of regular expressions an accuracy metric associated with the regular expressions so that in response to an indication that the accuracy metric is low, the user can adjust the regular expression manually instead of relying on the automatically generated regular expression. This results in more accurate utilization of regular expressions because inaccurate regular expressions can be detected and replaced manually, thereby avoiding use of regular expressions that can lead to inaccurate results. The techniques disclosed herein improve the functioning of computer technologies, such as search engines, text editors, dialog boxes, etc. that utilize regular expressions. Configuration management database (CMDB) technology is improved by utilizing the techniques disclosed herein to more accurately and efficiently store information about software assets. Further description of the techniques disclosed herein applied to CMDB technology is given below.

In some embodiments, regular expression matching is performed for software process analysis. As used herein, a process (short for software process) refers to an instance of a computer program (also known as an application) that is being executed by one or many threads. Several processes may be associated with the same application. In various embodiments, a regular expression is created by a machine learning model and the regular expression matches target strings associated with processes. For example, processes discovered in a data center can be analyzed to determine applications to which the processes belong in order to populate a CMDB with configuration items indicating which applications exist. A user may write a rule to determine which processes belong to which applications. An example rule may be that if a process name includes a specified word indicative of a specified application, then a CMDB is populated with a configuration item associated with the specified application. In an automated approach, processes belonging to a common application can be grouped according to a clustering algorithm. A name of a configuration item to reflect an application name (to populate the CMDB) can be determined using regular expression generation based on text data (e.g., string data) associated with processes that have been grouped (also referred to as a clustered group). In some embodiments, a machine learning model automatically generates the regular expression. In this manner, processes are automatically clustered and configuration items automatically generated, allowing a user to populate the CMDB automatically (e.g., with "one click").

A problem with automatically generating configuration items for a CMDB is that the regular expression classification of clustered groups may be inaccurate. If the classification is inaccurate, it would be beneficial for the user to have an opportunity to generate the regular expression manually. Thus, it would be beneficial to develop techniques for determining regular expression accuracy. In some embodiments, in response to a low accuracy, the user is prompted to manually adjust the regular expression. The techniques disclosed herein are valuable because they allow the user to benefit from the time savings of an automated regular expression approach when the automated approach is accurate and also detect inaccurate regular expressions and remediate them with a manual approach. This allows for both efficiency (saving time when possible with the automated approach) and accuracy (employing the manual approach when necessary) in regular expression generation.

In various embodiments, a regular expression is determined based on a specific group (e.g., a specific group of software processes). Assuming items (e.g., processes) in the specific group are similar to each other and distinct from items in other groups, the regular expression is expected to match a target string for most or all the items in the specific group but not items in other groups. How well the regular expression matches items from the specific group but not items from other groups is evaluated with an accuracy metric. In various embodiments, one step in determining this accuracy metric is testing the regular expression on a sampling from the specific group to determine how well the regular expression performs on the group it was created from. Stated alternatively, a true positive count is determined, wherein 100% regular expression matching of items in the specific group corresponds to a 100% true positive rate.

Furthermore, in various embodiments, another step in determining the accuracy metric is testing items from other groups (not the specific group) in order to determine how often the regular expression matches items it was not intended to match. Stated alternatively, a false positive count is also determined. In this technique, sampling of the specific group and other groups is representative (does not incur significant sampling error) as long as such groups have been clustered so that items within the groups are similar. With effective clustering, a small sampling within each group is representative of the group as a whole. In some embodiments, the true positive count is the numerator in the accuracy metric. In some embodiments, the number of items in the specific group plus the false positive count is the denominator in the accuracy metric. In some embodiments, the accuracy metric is expressed as a percentage. For example, if the true positive count equals the number of items in the specific group (corresponding to a true positive rate of 100%) and the false positive count is 0, then the accuracy metric expressed as a percentage is 100%. The accuracy metric progressively evaluates to a lower percentage for progressively higher false positive counts. Thus, the accuracy metric provides an indication as to how well the regular expression matches what it is intended to match. 100% or substantially 100% indicates manual adjustment of the regular expression is not needed and less than 100% indicates manual adjustment of the regular expression may be warranted.

Figure 1:
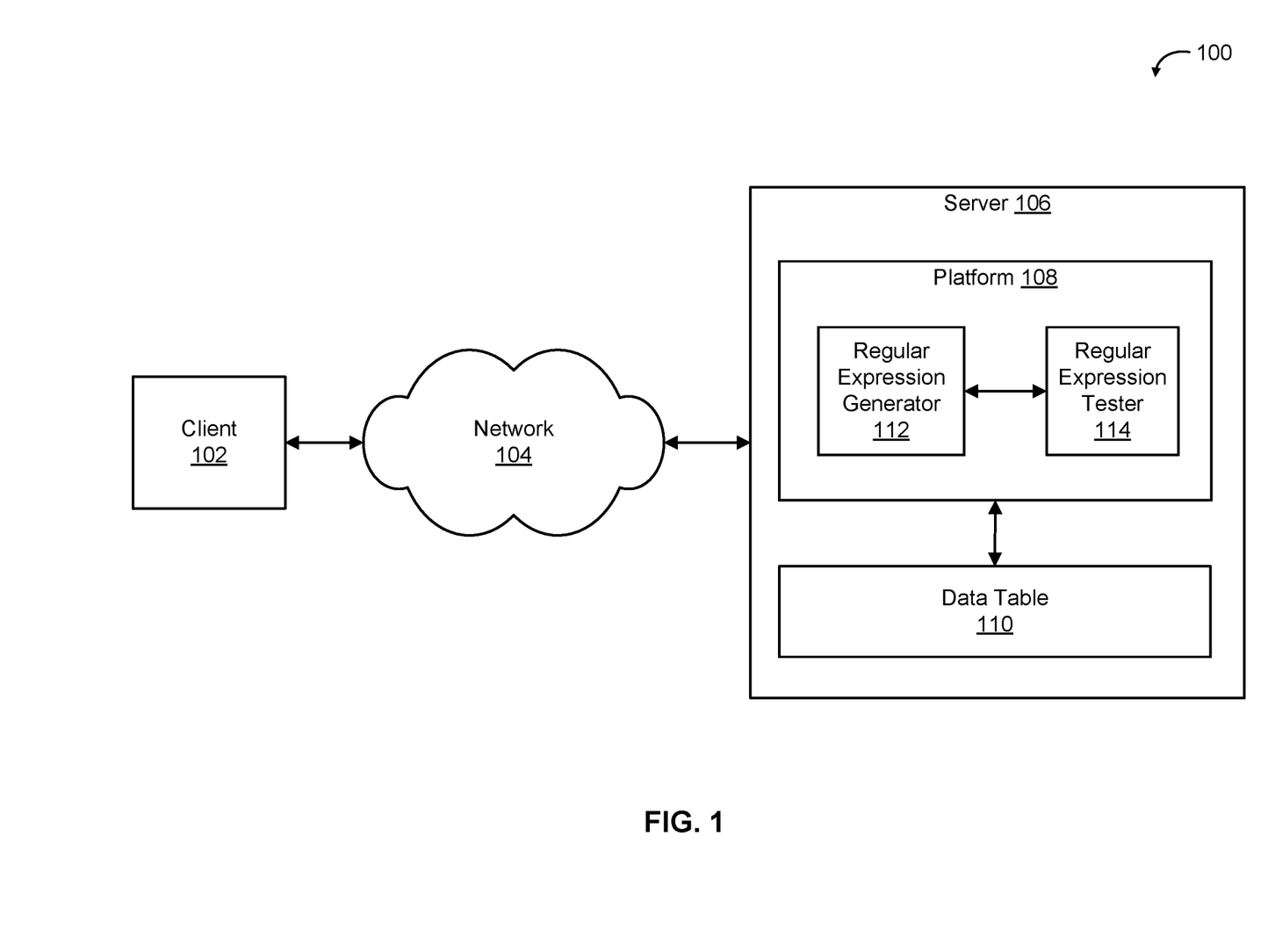
FIG. 1 is a block diagram illustrating an embodiment of a system for utilizing and testing regular expressions.

FIG. 1 is a block diagram illustrating an embodiment of a system for utilizing and testing regular expressions. In the example shown, system 100 includes client 102, network 104, and server 106. In various embodiments, client 102 is a computer or other hardware device that a user utilizes to interact with server 106. Examples of a client hardware device include: a desktop computer, a laptop computer, a tablet, a smartphone, or any other device. In various embodiments, the client hardware device includes a software user interface through which the user interacts with server 106. In various embodiments, the software user interface is utilized to perform regular expression matching.

In the example illustrated, client 102 is communicatively connected to network 104. Requests may be transmitted to and responses received from server 106 via network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 106 is a computer or other hardware component that stores a platform that includes regular expression functionality.

In the example shown, platform 108 runs on server 106. In some embodiments, platform 108 is an instance of a platform as a service (PaaS). In various embodiments, platform 108 includes a collection of programs or pieces of software (not shown in FIG. 1) designed and written to fulfill various particular purposes (e.g., information technology, human resources, cybersecurity, and/or other purposes). Platform 108 is communicatively connected to data table 110 and causes data to be read from and/or stored in data table 110. Data table 110 is a structured and organized collection of data stored on server 106. It is also possible for data table 110 to be located at least in part on a server separate from but communicatively connected to server 106.

In some embodiments, a software user interface of client 102 controls platform 108 to populate a CMDB with information associated with software assets. For example, the software assets may be applications (comprised of various software processes) running on server 106 or a separate computer system (not shown in FIG. 1) communicatively connected via network 104. In some embodiments, the various software processes have been clustered into groups corresponding to software applications. In some embodiments, descriptive information associated with the software processes are stored in data table 110. Examples of descriptive information include process command lines (that start processes) and process parameters (that specify configuration information when the processes are started). Client 102 may instruct platform 108 to perform regular expression analysis on the descriptive information associated with the software processes to determine an item name for each clustered group of processes (corresponding to an application) to store in the CMDB.

The techniques disclosed herein are not limited in applicability to groups of software processes. Data table 110 may also store descriptive information about other types of groups to be classified using regular expression analysis. For example, groups of alert messages (e.g., associated with equipment failures in a data center) can be classified. Outside of the information technology context, other groups are also possible. This is because the descriptive information associated with groups can be any type of text to which regular expression matching can be applied.

In the example shown, platform 108 includes regular expression generator 112 as a software component of platform 108. In various embodiments, for each group stored in data table 110, regular expression generator 112 automatically generates a regular expression for that group. The regular expression is generated based on text associated with the group. For example, the group can be a group of software processes and the text can be command lines and/or parameters of the software processes in the group. An item with which to populate a CMDB can be created based on the regular expression. Various approaches can be utilized for regular expression generator 112 to automatically generate the regular expression. For example, a genetic programming algorithm may be utilized to search for a regular expression that positively matches each item (e.g., matches text associated with each item) in a group. In some embodiments, a machine learning approach (e.g., based on neural networks) is utilized to select a regular expression that fits the positive examples in a specific group. In various automated approaches, negative examples are also provided to constrain the regular expression (to prevent the regular expression from being overly inclusive). Very common strings may also be excluded from analysis to avoid overly inclusive regular expressions. Other techniques may also be utilized to optimize and search for a regular expression that matches a set of positive examples and excludes a set of negative examples.

An existing problem in the technical field of automated regular expression generation is that an automatically generated regular expression can be highly inaccurate and differ significantly in terms of results produced compared with a regular expression that is manually generated. In the context of the software processes/CMDB example given above, an automatically generated regular expression can be overly inclusive and capture significantly more groups of software processes than intended. In such a situation, the CMDB may become populated with inaccurate and confusing data. The techniques disclosed herein address this problem associated with automated regular expression generation by providing an accuracy metric that a user can utilize to determine whether manual regular expression generation is needed.

In the example shown, platform 108 includes regular expression tester 114 as a software component of platform 108. In various embodiments, regular expression tester 114 receives a regular expression from regular expression generator 112 and tests its accuracy on data stored in data table 110. In various embodiments, regular expression tester 114 determines an accuracy metric of the regular expression, including by: testing the regular expression against a sampling of items known to belong to the group the regular expression was created from to determine a true positive metric, testing the regular expression against a sampling of items known to belong to other groups among a plurality of different groups outside the group the regular expression was created from to determine a false positive metric, and calculating the accuracy metric based at least in part on the true positive metric and the false positive metric. Regular expression tester 114 accesses data (e.g., text that describes the various groups) stored in data table 110 to determine the accuracy metric. Sampling of items within groups is performed in various scenarios. For example, sampling is needed when the number of items within each group is so large that it is not feasible to test all of the items.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients that connect to server 106 may exist. The number of components and the connections shown in FIG. 1 are merely illustrative. Components not shown in FIG. 1 may also exist.

Figure 2:
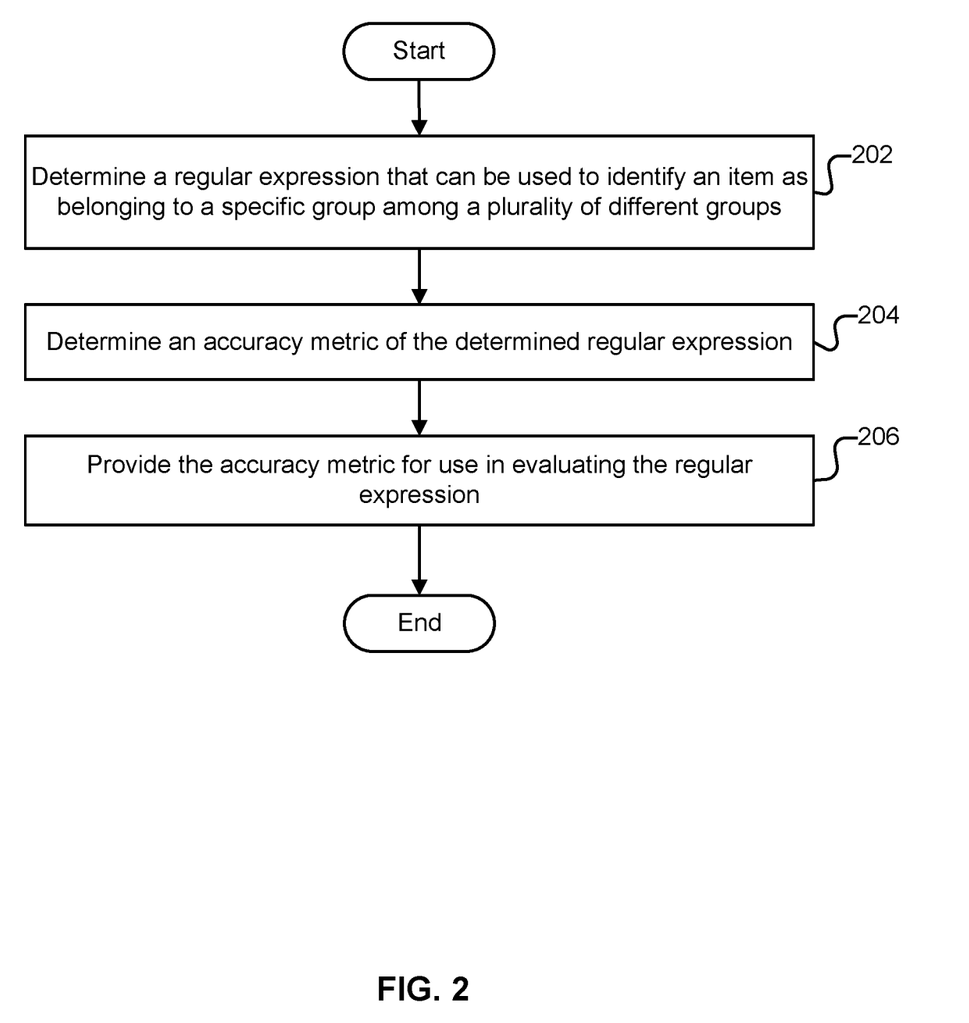
FIG. 2 is a flow chart illustrating an embodiment of a process for evaluating regular expression accuracy.

FIG. 2 is a flow chart illustrating an embodiment of a process for evaluating regular expression accuracy. In some embodiments, the process of FIG. 2 is performed by platform 108 of FIG. 1.

At 202, a regular expression that can be used to identify an item as belonging to a specific group among a plurality of different groups is determined. In various embodiments, the regular expression is determined based on items from the specific group. Stated alternatively, in various embodiments, items from the specific group are used as positive examples that the regular expression is created to match. In various embodiments, the regular expression is determined automatically. For example, machine learning (e.g., neural network based), genetic programming, or other techniques may be utilized to determine the regular expression automatically.

At 204, an accuracy metric of the determined regular expression is determined. In some embodiments, determining the accuracy metric includes testing the regular expression against a sampling of items known to belong to the specific group to determine a true positive metric, testing the regular expression against a sampling of items known to belong to other groups among the plurality of different groups outside the specific group to determine a false positive metric, and calculating the accuracy metric based at least in part on the true positive metric and the false positive metric.

At 206, the accuracy metric is provided for use in evaluating the regular expression. In various embodiments, the accuracy metric is displayed to a user. For example, the user may view the accuracy metric through a user interface of client 102 of FIG. 1. In some embodiments, in response to a determination that the accuracy metric falls below a specified threshold, the user is provided with a suggestion to manually adjust/customize the regular expression. In some embodiments, in response to the determination that the accuracy metric falls below the specified threshold, the accuracy metric is recalculated. For example, the sampling of the specific group and/or the other groups can be adjusted (e.g., increased). In addition, the underlying data of the items the regular expression is tested against can be modified. For example, in the context of the software processes/CMDB example given above, instead of testing the regular expression on command lines associated with processes in groups of processes, the regular expression can be tested on parameters, or vice versa (or both command lines and parameters can be tested together). In some embodiments, if the accuracy metric still falls below the specified threshold under various calculation methodologies, the user is provided with a suggestion to manually adjust the regular expression. In various embodiments, the user has an option to manually adjust the regular expression regardless of the numerical value of the accuracy metric.

Figure 3:
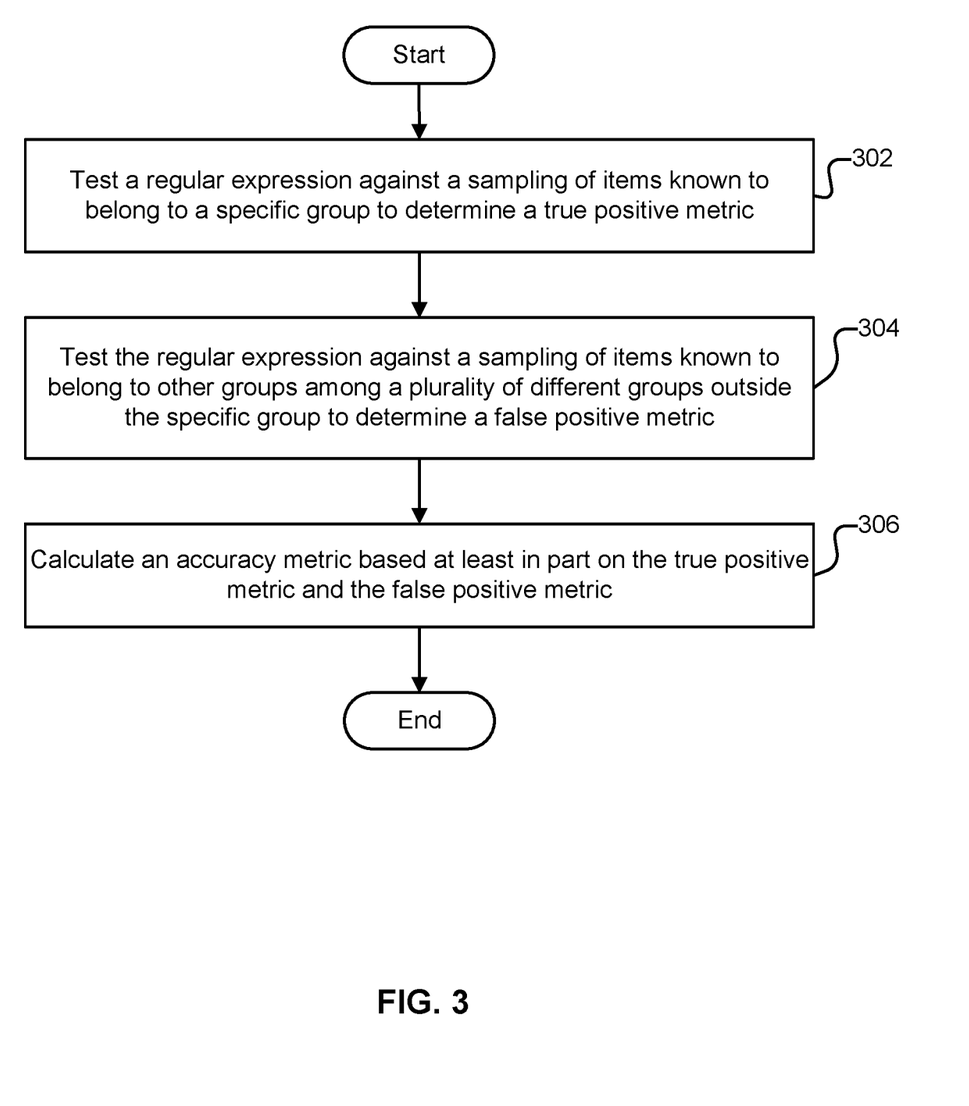
FIG. 3 is a flow chart illustrating an embodiment of a process for determining an accuracy metric of a regular expression.

FIG. 3 is a flow chart illustrating an embodiment of a process for determining an accuracy metric of a regular expression. In some embodiments, the process of FIG. 3 is performed by regular expression tester 114 of FIG. 1. In some embodiments, at least a portion of the process of FIG. 3 is performed in 204 of FIG. 2.

At 302, a regular expression is tested against a sampling of items known to belong to a specific group to determine a true positive (TP) metric. In various embodiments, the specific group is the group which the regular expression was created. In some embodiments, the regular expression is created based on a machine learning or other automated approach for the specific group. In some embodiments, the items in the specific group are software processes. In various embodiments, the items in the specific group are similar in one or more respects, e.g., software processes belonging to a common application. In various embodiments, within group similarity is high due to items, including items of the specific group, being clustered, meaning that a sampling of items within each group is likely to be representative of that group as a whole. Various approaches for clustering groups may be utilized. In some embodiments, the groups are clustered using density-based spatial clustering of applications with noise (DBSCAN). Other clustering approaches that may be used include K-means clustering, mean-shift clustering, expectation-minimization clustering using gaussian mixture models, agglomerative hierarchical clustering, and various other approaches known in the art.

At 304, the regular expression is tested against a sampling of items known to belong to other groups among a plurality of different groups outside the specific group to determine a false positive (FP) metric. With respect to the software processes/CMDB example, the other groups are groups of software processes that are not the group of software processes from which the regular expression was created. In various embodiments, within group similarity is high in the other groups due to items being clustered, meaning that a sampling of items within each group is likely to be representative of that group as a whole. In some embodiments, only a subset of all groups is tested in order to reduce testing time.

At 306, an accuracy metric is calculated based at least in part on the true positive metric and the false positive metric. In some embodiments, the accuracy metric equals TP divided by base, wherein base is equal to the number of items in the specific group plus FP. In some embodiments, the accuracy metric is expressed as a percentage (e.g., by multiplying the accuracy metric in decimal form by 100). Stated alternatively, in some embodiments, the accuracy metric, expressed in equation form is accuracy=[TP/(items in TP group+FP)] *100. The following numerical examples are illustrative of the above equation. Suppose there are 100 items (e.g., software processes) in the specific group from which the regular expression was created, 9 other groups of 100 items (e.g., software processes), and the regular expression is tested against a sampling of 10 items from each group (specific group as well as other groups). If the regular expression matches 9 out of 10 sampled items in the specific group and matches none of the sampled items in any of the other groups, then TP=90 (normalized to the number of items in the group), FP=0, and accuracy=[90/(100+0)] *100=90%. If all else in the above is kept the same but the regular expression matches 10 out of 10 sampled items in the specific group, then TP=100 (normalized to the number of items in the group), FP=0, and accuracy=[100/(100+0)] *100=100%. Now, keeping TP=100, suppose that the regular expression matches 1 out of 10 sampled items in one other group. This means that FP=10 (1 out of 10 normalized to 10 out of 100). Then accuracy=[100/(100+10)] *100=90.9%.

The above merely illustrates a single example of calculating an accuracy metric based on a true positive metric and a false positive metric. The accuracy metric may be calculated in various other ways. In some embodiments, in order to generate a more conservative estimate, if the false positive match rate in one of the other groups meets a specified threshold, all of the items in that group are counted as false positives. For example, if the specified threshold is 20%, then if 2 out of 10 items are matched in a group of 100, then the number of false positives would be 100. In some embodiments, if just one item is matched in one of the other groups, then all of the items in that group are counted as false positives. Furthermore, calculation of the accuracy metric can be adjusted by modifying the sampling of the specific group (e.g., changing the sampling rate), modifying the sampling of other groups (e.g., changing the sampling rate), and/or modifying the number or percentage of other groups to test. In scenarios in which the number of other groups is large (e.g., thousands, millions, etc.), it may be necessary from a computational perspective to limit testing to a portion of those groups.

Figure 4:
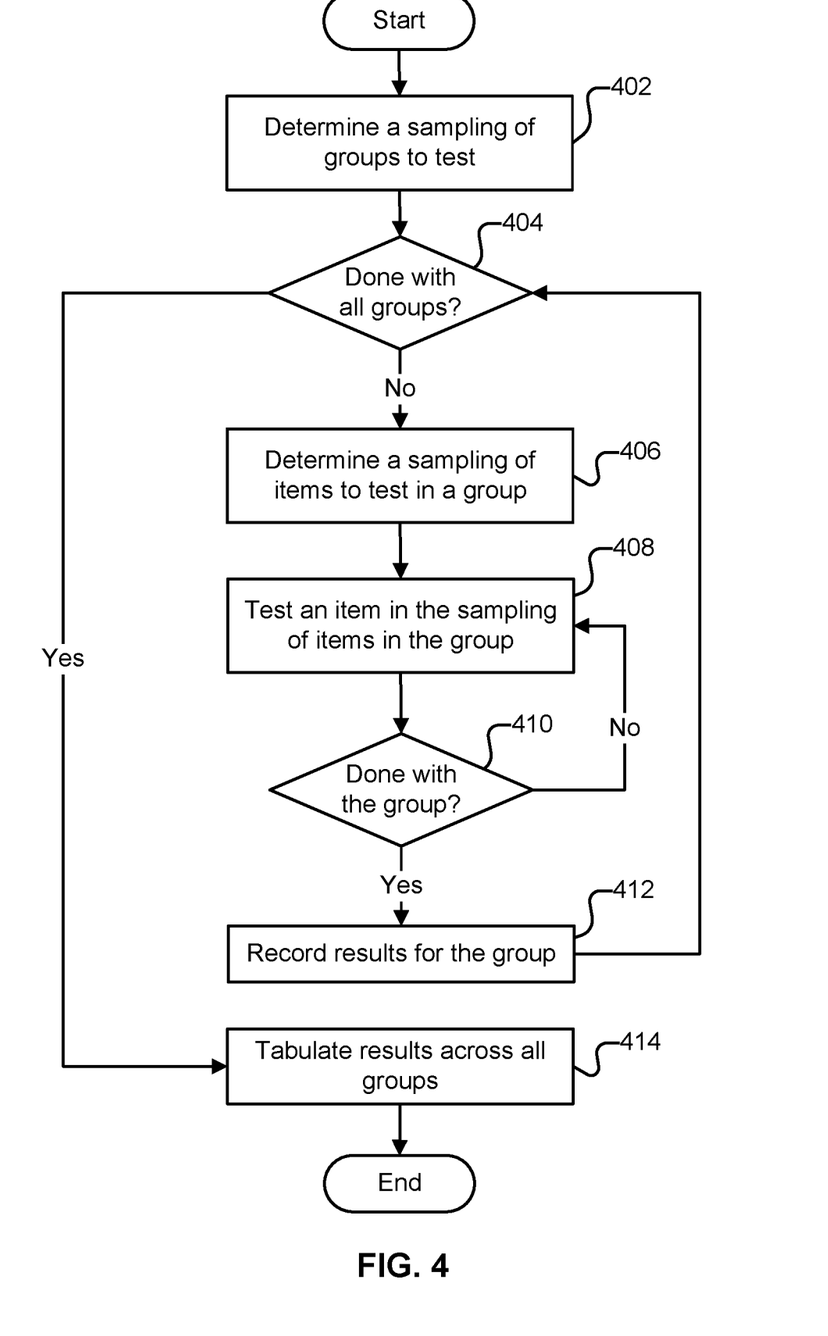
FIG. 4 is a flow chart illustrating an embodiment of a process for determining a false positive metric of a regular expression.

FIG. 4 is a flow chart illustrating an embodiment of a process for determining a false positive metric of a regular expression. In some embodiments, the process of FIG. 4 is performed by regular expression tester 114 of FIG. 1. In some embodiments, at least a portion of the process of FIG. 4 is performed in 304 of FIG. 3.

At 402, a sampling of groups to test is determined. The false positive metric is determined by testing the regular expression on items from a plurality of groups. These groups are groups outside of a group from which the regular expression was created. In various embodiments, particularly when the number of groups that could be tested is large, a specified number or specified percentage of groups is selected for testing. For example, a set of groups equal in number to the specified number may be chosen randomly, after which testing is commenced with a group from the set of groups.

At 404, it is determined whether all groups in the set of groups to be tested have been tested. If it is determined at 404 that all groups have been tested, at 414, results across all groups are tabulated. In various embodiments, tabulating results across all groups includes summing a total number of matches (false positives) of all items across all the groups. This can be performed by summing the results from each group tested (e.g., results recorded for each group at 412). If it is determined at 404 that not all groups have been tested, at 406, a sampling of items to test in a group is determined. For example, a specified number or percentage of items in the group may be tested. The group that is tested is one selected from all the groups. Groups are tested until it is determined at 404 that there are no more groups to test.

At 408, an item in the sampling of items in the group is tested. For example, the item may be text (e.g., command line, parameters, etc.) associated with a software process from a group of software processes. In various embodiments, it is determined whether the regular expression positively matches text associated with the item. A positive match is recorded as a false positive.

At 410, it is determined whether all items in the sampling of items in the group have been tested. If it is determined at 410 that not all items have been tested, at 408, another item in the sampling of items in the group is tested. If it is determined at 410 that all items have been tested, at 412, results for the group are recorded. In various embodiments, recording results for the group includes recording the number of matches (false positives) for the group. After the results for the group are recorded, it is determined at 404 if there are more groups to test among the sampling of groups to test. The results for each group are combined and tabulated at 414 after all groups in the sampling of groups to test have been tested.

Figure 5:
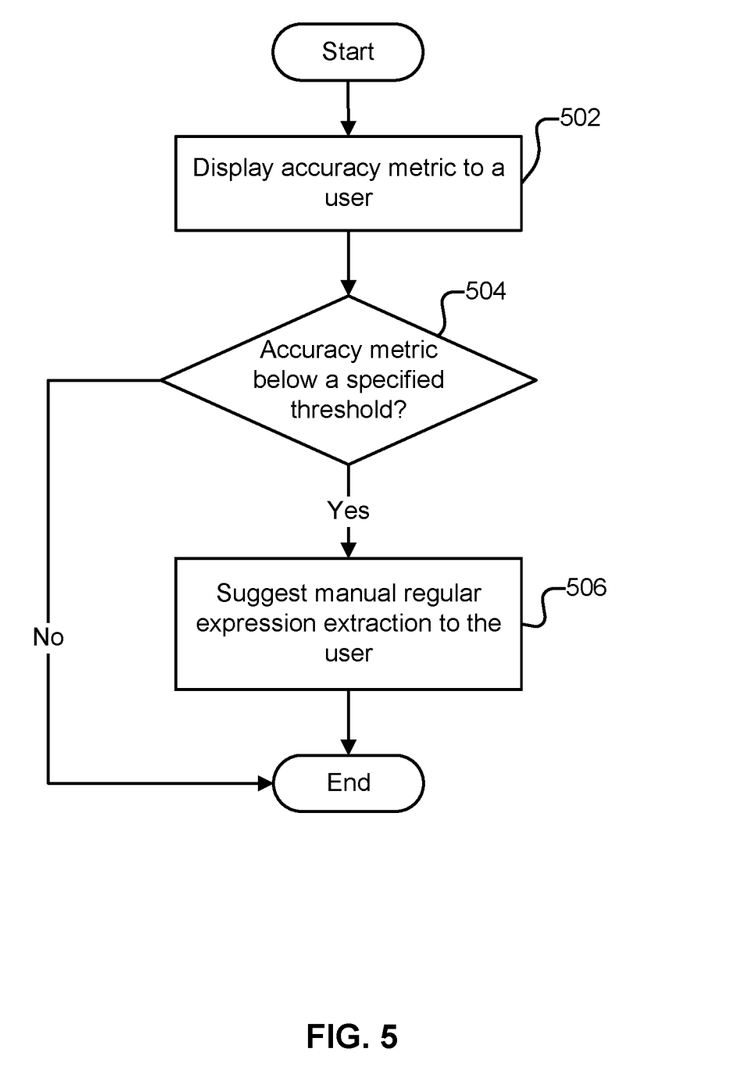
FIG. 5 is a flow chart illustrating an embodiment of a process for responding to an evaluation of regular expression accuracy.

FIG. 5 is a flow chart illustrating an embodiment of a process for responding to an evaluation of regular expression accuracy. In some embodiments, the process of FIG. 5 is performed by platform 108 of FIG. 1. In some embodiments, at least a portion of the process of FIG. 5 is performed in 206 of FIG. 2.

At 502, an accuracy metric (of a regular expression) is displayed to a user. In some embodiments, the accuracy metric is based at least in part on a true positive metric and a false positive metric. In various embodiments, the regular expression was automatically generated. In some embodiments, the user views the accuracy metric using a display device of client 102 of FIG. 1.

At 504, it is determined whether the accuracy metric is below a specified threshold. If it is determined at 504 that the accuracy metric is below the specified threshold, at 506, manual regular expression generation is suggested to the user. In some embodiments, the user is presented with an option to manually customize/adjust the automatically generated regular expression. It is also possible to recalculate the accuracy metric before suggesting manual action by the user. For example, sampling associated with calculating the accuracy metric can be adjusted and/or the underlying data the regular expression is tested against can be modified (e.g., in the context of groups of software processes, instead of testing the regular expression on command lines, the regular expression can be tested on parameters, or vice versa or both command lines and parameters can be tested together). If it is determined at 504 that the accuracy metric is not below the specified threshold, no further action is taken.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a regular expression that is used to identify an item as belonging to a specific group among a plurality of different groups;
   testing the regular expression against a sampling of items known to belong to the specific group to determine a true positive metric;
   testing the regular expression against a sampling of items known to belong to other groups among the plurality of different groups outside the specific group to determine a false positive metric;
   calculating an accuracy metric of the determined regular expression based at least in part on the true positive metric and the false positive metric, wherein calculating the accuracy metric of the determined regular expression includes calculating a quotient comprising a numerator portion that is based at least in part on the true positive metric and a denominator portion that is based at least in part on the false positive metric, wherein the denominator portion equals a sum of the false positive metric and a count of items in the specific group; and
   providing the accuracy metric for use in evaluating the regular expression.

2. The method of claim 1, wherein determining the regular expression includes automatically generating the regular expression based on text data associated with the specific group.

3. The method of claim 1, wherein the specific group comprises a plurality of software processes.

4. The method of claim 3, wherein the regular expression is used to determine a database field corresponding to the specific group with which to populate a configuration management database.

5. The method of claim 1, wherein testing the regular expression against the sampling of items known to belong to the other groups among the plurality of different groups outside the specific group includes applying the regular expression to text data associated with the sampling of items.

6. The method of claim 5, wherein the text data includes commands for starting software processes.

7. The method of claim 5, wherein the text data includes parameters that specify configuration information for software processes.

8. The method of claim 1, wherein the true positive metric corresponds to a number of items that the regular expression positively matches in the specific group.

9. The method of claim 1, wherein the false positive metric corresponds to a number of items that the regular expression positively matches in the other groups among the plurality of different groups outside the specific group.

10. The method of claim 1, wherein the numerator portion equals the true positive metric.

11. The method of claim 1, wherein providing the accuracy metric for use in evaluating the regular expression includes transmitting the accuracy metric to a user via a network.

12. The method of claim 1, wherein providing the accuracy metric for use in evaluating the regular expression includes providing a user with an option to manually adjust the regular expression.

13. The method of claim 1, further comprising recalculating the accuracy metric in response to a determination that the accuracy metric falls below a specified threshold.

14. The method of claim 1, further comprising providing a suggestion to a user to manually adjust the regular expression in response to a determination that the accuracy metric falls below a specified threshold.

15. The method of claim 1, wherein items belonging to the specific group and the other groups among the plurality of different groups outside the specific group have been grouped using data clustering.

16. The method of claim 15, wherein the data clustering is associated with density-based spatial clustering of applications with noise.

17. A system, comprising:
   one or more processors configured to:
      determine a regular expression that is used to identify an item as belonging to a specific group among a plurality of different groups;
      test the regular expression against a sampling of items known to belong to the specific group to determine a true positive metric;
      test the regular expression against a sampling of items known to belong to other groups among the plurality of different groups outside the specific group to determine a false positive metric;
      calculate an accuracy metric of the determined regular expression based at least in part on the true positive metric and the false positive metric, wherein the one or more processors are configured to calculate the accuracy metric of the determined regular expression including by being configured to calculate a quotient comprising a numerator portion that is based at least in part on the true positive metric and a denominator portion that is based at least in part on the false positive metric, wherein the denominator portion equals a sum of the false positive metric and a count of items in the specific group; and provide the accuracy metric for use in evaluating the regular expression; and a memory coupled with the one or more processors and configured to provide the one or more processors with instructions.

18. A computer program product, the computer program product being embodied in a non-transitory computer readable storage medium and comprising computer instructions for:

determining a regular expression that is used to identify an item as belonging to a specific group among a plurality of different groups;

testing the regular expression against a sampling of items known to belong to the specific group to determine a true positive metric;

testing the regular expression against a sampling of items known to belong to other groups among the plurality of different groups outside the specific group to determine a false positive metric;

calculating an accuracy metric of the determined regular expression based at least in part on the true positive metric and the false positive metric, wherein calculating the accuracy metric of the determined regular expression includes calculating a quotient comprising a numerator portion that is based at least in part on the true positive metric and a denominator portion that is based at least in part on the false positive metric, wherein the denominator portion equals a sum of the false positive metric and a count of items in the specific group; and providing the accuracy metric for use in evaluating the regular expression.

19. The computer program product of claim 18, wherein determining the regular expression includes automatically generating the regular expression based on text data associated with the specific group.

20. The computer program product of claim 18, wherein the specific group comprises a plurality of software processes.

* * * * *